3,276,510
CONCENTRATION OF PHOSPHORIC ACID
James Austin, Maidenhead, and John D. Ellis, Chalfont
St. Giles, England, assignors to Occidental Research &
Engineering Limited, London, England, a corporation
of Great Britain
Filed Mar. 16, 1965, Ser. No. 440,185
Claims priority, application Great Britain, July 21, 1964,
29,520/64
22 Claims. (Cl. 159—16)

This invention concerns the production of phosphoric acids, in particular phosphoric acids of high $P_2O_5$ content. For the purposes of this specification, the expression "phosphoric acids of high $P_2O_5$ content" is to be understood as meaning phosphoric acids containing not less than 68% $P_2O_5$ w./w. (weight of acid to weight of solution) on an impurity-free basis (IFB) (calculated as the percentage by weight of $P_2O_5$ in relation to the total weight of $P_2O_5$ plus both free and combined water in the acid concerned) and includes the acids known as "superphosphoric acids" having $P_2O_5$ contents in the range 68–79% w./w. (IFB), acids having $P_2O_5$ contents in range 79–89% w./w. (IFB) which may conveniently be called "astrophosphoric acids" and acids containing in excess of 89% w./w. $P_2O_5$ (IFB), called "ultraphosphoric acids" herein.

The commercial production of phosphoric acids is generally undertaken by one of two general procedures, viz. the "wet process" in which bone ash or, more usually, ground phosphate rock, containing apatite $$(3Ca_3(PO_4)_2 \cdot CaF_2)$$

and/or tricalcium phosphate $(Ca_3(PO_4)_2)$ is digested with dilute mineral acid (e.g. sulphuric acid) to produce a weak orthophosphoric acid solution and a calcium salt which is then separated from the solution by an appropriate technique; and the "furnace process." The "wet process" acid is normally produced at low strength (e.g. 27–33% $P_2O_5$ w./w. (IFB) and although it should desirably be concentrated to higher strengths prior to use in, for instance, the production of fertilizer compositions it is nevertheless a very convenient, readily available and economic material for bulk production of fertilizer and other phosphate compositions.

The present invention is, therefore, primarily concerned with the concentration of wet-process phosphoric acids to high $P_2O_5$ contents for subsequent conversion to concentrated phosphate-containing compositions, such as fertilizers.

Generally, wet-process phosphoric acid has, as noted, a $P_2O_5$ content in range 27–33% w./w. (IFB) the $P_2O_5$ being substantially entirely present in the form of orthophosphoric acid $(H_3PO_4)$. It also contains impurities such as calcium, iron, aluminium, magnesium and other metals together with fluorine compounds and other contaminants, the amount and nature of the impurities depending upon the raw materials used in its preparation. Concentration of this weak acid to higher strengths involves evaporation of the water of solution and for concentration to $P_2O_5$ contents of up to about 68% w./w. (IFB) many evaporation techniques are available. In selecting an evaporation technique for this purpose, account must be taken of the corrosive nature of the acid, which involves problems in the selection of materials of construction, and also of the problem of scale formation on heat transfer surfaces since the impurities in the acid are such as to conduce to the rapid accretion of a hard scale of calcium salts (sulphate and phosphate) on any high temperature surfaces in contact with the acid. For these reasons, techniques involving indirect heating of the acid are difficult to apply and tend to have a low thermal efficiency.

Evaporation by submerged combustion and analogous techniques, in which heating is accomplished by direct exposure of the liquid to hot combustion products and which are of very high thermal efficiency, would, on the other hand, appear to avoid the problem of scale formation on heat transfer surfaces, ease the problem of selecting constructional materials and also show high thermal efficiency and other economic advantages in concentrating wet-process phosphoric acid. However, this application of such techniques has up to recently been prevented by the problem of dealing satisfactorily and economically with the noxious effluent that would be produced by the evaporator but this problem has now been overcome by the effluent-treatment apparatus disclosed in co-pending application Serial No. 440,184, filed March 16, 1965.

The problems involved in concentrating wet-process phosphoric acid to $P_2O_5$ contents above about 68% w./w. (IFB) are considerably more severe than those involved in concentrating such acid up to about this strength. Not only are there greater problems in selecting suitable materials of construction capable of withstanding the higher temperatures and more corrosive conditions imposed, but, in addition, the problems of scale formation on heat transfer surfaces are much increased by the tendency of hot concentrated phosphoric acid to form insoluble polyphosphates and metaphosphates with certain of the impurities normally found in the wet-process acid.

Thus it should be recalled that phosphoric acid exists in many forms; there are, for instance orthophosphoric acid $(H_3PO_4)$, pyrophosphoric acid $(H_4P_2O_7)$, polyphosphoric acids (three or more orthophosphoric acid units condensed with elimination of water molecules) and metaphosphoric acid $(HPO_3)$ which occurs in cyclic polymers (see "Phosphorus and Its Compounds," vol. 1, by John R. Van Wazer, published by Interscience (New York), 1958). Pure aqueous solutions of $P_2O_5$ in concentrations up to about 68% w./w. contain substantially only orthophosphoric acid; above this $P_2O_5$ content, increasing amounts of pyrophosphoric acid and other polyphosphoric acids appear. For instance at a $P_2O_5$ content of 79% w./w., the solution may be found to contain 20% orthophosphoric acid, 46% pyrophosphoric acid, 20% tripolyphosphoric acid, 8% tetrapolyphosphoric acid, 3% pentapolyphosphoric acid and 1% hexapolyphosphoric acid. At a $P_2O_5$ content of 84% w./w. the proportion of orthophosphoric acid has fallen to about 3% and the proportion of pyrophosphoric acid to 10%, the bulk of the $P_2O_5$ being present in the form of polyphosphoric acids, those polyphosphoric acids including ten or more orthophosphoric acid units accounting for at least 25% of the $P_2O_5$ content. At a $P_2O_5$ content greater than 87% w./w. the constitution changes, concentrates having $P_2O_5$ contents rising above this value consisting to increasing extents of cross-linked polyphosphoric acids and polymers of metaphosphoric acid units.

During concentration of phosphoric acid solutions by evaporation, local high temperatures and concentration gradients affect the proportional distribution of the various forms of the acid; in concentrating a wet-process acid, the normal impurities found therein include calcium, iron and aluminium cations which react with the higher polyphosphoric and polymeric metaphosphoric acids to form insoluble compounds the formation of which conduces to the formation of such forms of the acid by disturbing the equilibrium distribution of the various forms of the acid. Thus the concentration of wet-process acid to $P_2O_5$ contents in excess of about 68% w./w. (IFB) leads to the formation of unexpectedly large amounts of insoluble polyphosphates and metaphosphates as hard scale on heat-transfer surfaces of the evaporator.

For this reason, evaporation techniques involving indirect heat transfer to the acid are, as a practical matter, entirely ruled out for the large-scale, economic concentration of wet-process phosphoric acid to $P_2O_5$ contents above about 73% w./w. (IFB). For such purposes a submerged combustion or analogous technique is essential.

The pioneer work of the Tennessee Valley Authority (TVA) demonstrated the feasibility of employing submerged combustion or analogous evaporation techniques to concentrate wet-process phosphoric acid to $P_2O_5$ contents significantly above 68% w./w. and also indicated certain problems that would arise in an attempt to commercialize such a process. Thus this work, performed with a relatively small-scale pilot plant, indicated that the evaporator exhaust effluent would contain increasingly large amounts of valuable phosphorus and other contaminants as the evaporation temperature was raised to achieve product acids of higher $P_2O_5$ content, indicating a severe problem in treating such effluent to recover at least the valuable phosphorus content thereof. The work also indicated a need to minimise retention of the product at high temperature in the evaporator in order to minimise the formation of insoluble polyphosphates and metaphosphates the formation of which, as noted above, is promoted by high temperatures. However, because of the relatively small scale of the pilot plant used, TVA did not encounter another problem, excessive formation of insoluble polyphosphates and metaphosphates in the product, that attends attempts to effect concentration of phosphoric acid on a large scale to high $P_2O_5$ contents.

As noted, the work of TVA indicated that the application of submerged combustion and analogous techniques to concentrating such acid to $P_2O_5$ contents above 68% w./w. (IFB) would involve severe problems in dealing with the evaporator effluent. The expected major effluent contaminants are phosphorus, fluorine and sulphur compounds. Experiment has borne out this expectation and has also shown that such contaminants appear in different relative amounts in the effluent from an evaporator fed with an acid having a $P_2O_5$ content of about 54% w./w. and concentrating such acid to a $P_2O_5$ content of about 80% w./w. (IFB) as compared with their proportion in the effluent of an evaporator fed with an acid of 30% w./w. $P_2O_5$ content and concentrating such acid to a $P_2O_5$ content of about 54% w./w.

Thus experiment shows that during concentration of a 30% w./w. $P_2O_5$ wet-process acid to a $P_2O_5$ content of up to about 54% w./w., the bulk (about 80%) of the fluorine content is driven off in the evaporator effluent so that the fluorine compound content of the effluent of an evaporator fed with acid of 54% w./w. $P_2O_5$ content is relatively low.

On the other hand, experiment has shown that the proportion of phosphorus compounds in the effluent rises markedly with increasing $P_2O_5$ content in the acid produced in the evaporator, phosphoric acid tending to distil in quantity in the effluent as the $P_2O_5$ content of the evaporator product rises above about 79% w./w. (IFB).

We have found, however, these effluent problems, although different from those exhibited in concentrating wet-process acid to $P_2O_5$ contents up to about 54% w./w., are nevertheless susceptible of solution.

Thus in one aspect the present invention provides a process for the obtaining of phosphoric acids of high $P_2O_5$ content, comprising continuously feeding a wet-process phosphoric acid solution to a heating zone and continuously withdrawing a more concentrated product containing at least 68% $P_2O_5$ w./w. (IFB) from such zone while maintaining such product at its boiling point in said zone by releasing hot combustion products into the body of the product in said zone; passing the gaseous effluent from such zone to a scrubbing zone to flow thereing at a velocity in the range 15 to 100 feet per second; causing said effluent to flow with a velocity in the range 100 to 400 feet per second while passing through apertures in a barrier obturating said scrubbing zone, thereby to effect a pressure drop not less than 15 inches water gauge across said barrier; projecting a coarse spray of hot weak prosphoric acid at the upstream face of said barrier to cause large droplets of such acid to break, on said face of the barrier, into smaller droplets that move generally parallel with said barrier face and intercept the effluent flowing through said apertures; separating said sprayed phosphoric acid from the effluent downstream of said barrier; and thereafter treating the separated gaseous effluent with cold water.

The initial treatment of the effluent with hot weak phosphoric acid in said scrubbing zone serves to recover, from the effluent, the phosphorus compounds in a form in which they may be directly recycled to the evaporator, since the acid recovered by separation from the stream passing the barrier in the scrubbing zone may be added to the evaporator feed.

Preferably the acid sprayed at said barrier has a $P_2O_5$ content of about 30% w./w. but it may have a $P_2O_5$ content up to about 50% with some sacrifice of effectiveness in removal of phosphorus compounds from the evaporator effluent. Conveniently, the scrubbing zone and separator may operate in a closed acid circuit, acid recovered from the separator being fed to a tank from which it is drawn to be sprayed at the barrier, the concentration of the acid being maintained within appropriate limits by drawing off acid from the tank, e.g. for addition to the evaporator feed, and adding water to the tank to replace the withdrawn acid.

Conveniently, the acid sprayed at the barrier in the scrubbing zone has a temperature in the range 70–120° C. (160–250° F.).

Preferably the apertures in the scrubbing zone barrier are substantially circular with diameters in the range 1/8 inch to 1 inch, conveniently being about 1/2 inch in diameter. Preferably, moreover, the size and number of apertures in the barrier are so selected as to give rise to an effluent velocity through the apertures in the range 300–350 feet per second with a pressure drop in the range 35 to 40 inches W.G.

The scrubbing zone is preferably vertically arranged or inclined to the horizontal, the effluent passing through the zone in a downwards direction so that the acid sprayed at the barrier is prevented from flowing to the evaporator.

Following separation of phosphoric acid from the gaseous effluent downstream of the scrubbing zone barrier, the gaseous effluent must be treated with cold water to cool it and reduce its content of fluorine and sulphur compounds, that are not substantially absorbed by the hot weak phosphoric acid sprayed at the barrier in the scrubbing zone, before such effluent may be safely released to atmosphere. Such treatment may be effected with any suitable plant for the purpose, but preferably such treatment is effected in a cooling zone having one or, preferably, more barriers obturating the same, the or each such barrier having apertures therethrough and being sprayed on its upstream face with a coarse spray of cold water (e.g. sea water, if available) in such manner that small water droplets move generally parallel with the barrier so that the effluent passing through the apertures in the barrier is intercepted by such droplets and becomes intimately mixed with the water sprayed on the barrier. If such an arrangement is adopted with three barriers, the apertures in each barrier are preferably substantially circular with diameters in the range 1/8 inch to 1 inch, the size and number of the apertures being selected to give rise to a gas velocity through the apertures in the range 80–100 feet per second with a pressure drop not exceeding about 4 inches W.G. across each barrier. Desirably, the barrier apertures have a diameter of about 1/2 inch and their number is such to give rise to a gas velocity through the apertures of about 85 feet per second with a pressure drop of about 3 inches W.G.

Desirably, the gaseous effluent leaving such a cold water treatment arrangement is passed through devices such as a fibre filter and a cyclone separator, respectively effective to agglomerate fine liquid particles in the gas stream and to separate the resulting droplets from the latter, whereby the gas stream is finally substantially wholly freed of noxious and toxic contaminants and may be safely discharged to atmosphere.

Prior to entering the scrubbing zone, the effluent from the heating zone is preferably caused to pass through an upwardly extending off-take duct fitted with baffles and/or louvres that serve to divert the effluent from side-to-side in such off-take duct and cause the effluent to deposit in the latter entrained liquid thereby to reduce the quantity of such liquid (mainly phosphoric acid) which has to be removed from the effluent in the scrubbing zone.

Desirably, to minimise the formation of insoluble polyphosphate and metaphosphate compounds in the product, the volume of the heating zone is kept to a low value in relation to the volumetric rates of concentrate feed and product withdrawal, thereby to minimise retention of the product at heating zone temperature. With a submerged combustion evaporator of conventional design but having relatively low evaporative capacity and a restricted heating zone volume, products of economically low insoluble polyphosphate and metaphosphate content may be obtained with a very high recovery of total $P_2O_5$ throughput.

However, when attempts are made to operate the process of the present invention on a large scale by the use of a conventional submerged combustion evaporator having a high evaporative capacity, for instance having a burner arrangement of heat-release rate in excess of 1–2 million B.t.u. per hour, the expedient of minimizing product retention at heating zone temperatures no longer suffices to restrict the formation of insoluble polyphosphate and metaphosphate compounds.

Thus, if, using a large submerged combustion evaporator of conventional design, a series of experiments were made with a given feed concentrate of wet-process phosphoric acid and with the burner arrangement operated in successive experiments at different heat-release rates, the throughput being adjusted so that each experiment led to a product of selected high $P_2O_5$ content, a plot of the insoluble polyphosphate and metaphosphate compound content of the product against burner heat-release rate would show a minimum insoluble compound content at a "critical" heat-release rate value over one million B.t.u./hour but considerably below what would be regarded as a typical operating heat-release rate for the arrangement in question. Below such "critical" heat-release rate value, the decrease in insoluble compound content with increase of heat-release rate (and throughput) values is clearly due to the decrease in retention of the product at heating zone temperatures as the throughput is raised, with the heat-release rate, to maintain the overall $P_2O_5$ content of the product at the selected value. However, in the region of the "critical" heat-release rate value and thereabove, some other factor affecting product insoluble compound content and apparently related to the heat-release rate obviously assumes an increasingly greater importance than product mean retention time at heating zone temperatures. Indeed, it will usually be found that at heat-release values somewhat above the "critical" value the product exhibits an insoluble compound content many times the minimum.

Accordingly, whereas a small evaporator designed and operated to give low product retention at heating zone temperatures and with, for instance, a burner arrangement of conventional design operating at a heat release rate of up to about 1 million B.t.u. per hour can concentrate a wet-process phosphoric acid to high $P_2O_5$ content with the expected distribution of polymeric acids and compounds, larger plants of the same design are found to produce acids containing unexpectedly large amounts of insoluble high polymeric compounds that, for many end uses of the product, are undesirable constituents and represent loss of valuable phosphorus from the feed acid.

Our investigation into the possible causes of the above-mentioned anomalies in the constitution of high $P_2O_5$-content products of large-scale submerged combustion and analogous evaporators have shown that an important factor is, apparently, instability of the interface between the liquid and gases at the exhaust orifice of the usual dip tube that leads the combustion products below the surface of the acid being concentrated, due to irregularities in the flow of gases from the orifice and into the liquid. Thus when normal design criteria are applied to the construction of a high heat-release rate burner arrangement for a large-scale evaporator, the dip tube orifice is large and the flow of gases from the dip tube into the liquid is irregular, the gas stream forming bubbles that break away from the dip tube orifice in various and fluctuating paths over and around the end of the tube, with the result that the gas/liquid interface moves irregularly over different regions of the end surface and over areas of the bore of the dip tube and of its external surface. It appears that such movement of the interface permits portions of liquid to come momentarily into contact with dip tube regions that have previously been heated to high temperature by the gas stream passing thereover, whereby such liquid portions are subject to over-concentration and form high polymeric acids and compounds thereof as solid incrustations on the dip tube regions in question. Also the gas flow irregularity conduces to small liquid portions being encapsulated in bubbles of hot gas and thereby subject to over-concentration. The incrustations may be subject to repeated sequential overheating and wetting with liquid and build up to considerable extents.

Consideration of the possible causes of the aforesaid instability of the gas flow from the dip tube orifice of a large submerged combustion or analogous burner arrangement suggested that a critical factor could be the relationship between the volumetric flow rate of the gas from the orifice and the perimeter of the orifice (or of a dimension of some part of the dip tube near the orifice) and that because normal design criteria lead to the choice of an orifice size such as to achieve, in all burner arrangements intended to operate with the dip tube immersed to about the same depth (generally a value in the range 6 to 18 inches but sometimes up to 120 inches) in the liquid, a gas flow velocity which lies with a fairly narrow range (typically a value in the range 200 to 350 feet per second for a gas temperature of 1400° C. (2540° F.)), the ratio of volumetric flow rate to orifice perimeter increases with increasing orifice size since the flow rate increases in proportion to the square of the orifice radius whereas orifice perimeter is a linear function of such radius.

Thus we were led to consider the possible importance of the radial extent of the end surface of the dip tube, surrounding the orifice, as a factor that determine the flow stability. We concluded that stable flow conditions would probably occur when the gas flowing from the dip tube orifice could form a bubble, the boundary of which lay on a substantially horizontal surface at the end of the dip tube. Experiments have shown this conclusion to be correct.

Accordingly, when practicing the process of the present invention on a large scale, it is desirable to employ an evaporator having a burner arrangement constructed as disclosed in the specification of our co-pending application Serial No. 440,239, filed March 16, 1965.

Thus in its preferred embodiments, the process of our invention comprises continuously feeding a wet-process phosphoric acid solution to a heating zone and continuously withdrawing a more concentrated product containing at least 68% $P_2O_5$ w./w. (IFB) from such zone; passing hot combustion products into a dip tube depending vertically into the liquid in said heating zone to be released from an exhaust orifice at the lower end of said dip tube into the body of liquid in such zone while forming a stable bubble at said lower end of said dip tube with the periphery of the bubble stably located on an annular surface surrounding said exhaust orifice, thereby to maintain liquid in said heating zone at the boiling point of said product; passing the gaseous effluent from such zone to a scrubbing zone to flow therein at a velocity in the range 15 to 100 feet per second; causing said effluent to flow with a velocity in the range 100 to 400 feet per second while passing through apertures in a barrier obturating said scrubbing zone, thereby to effect a pressure drop not less than 15 inches water gauge across said barrier; projecting a coarse spray of hot weak phosphoric acid at the upstream face of said barrier to cause large droplets of such acid to break, on said face of the barrier, into smaller droplets that move generally parallel with said barrier face and intercept the effluent flowing through said apertures; separating said sprayed phosphoric acid from the effluent downstream of said barrier; and thereafter treating the separated gaseous effluent with cold water.

The invention also includes apparatus for performing the method thereof in its preferred embodiments.

Thus the invention further provides apparatus for concentrating wet-process phosphoric acid to $P_2O_5$ contents greater than 68% w./w. (IFB), such apparatus comprising an evaporator including a hot well; means for feeding a wet-process phosphoric acid solution to such hot well; means for withdrawing a more concentrated product from such hot well; a dip tube depending vertically into said hot well, said dip tube having its lower end positioned to be below the level of liquid in said hot well and terminating in an exhaust orifice; an annular surface surrounding said exhaust orifice; means for feeding hot combustion products to said dip tube to be released from said exhaust orifice into the body of liquid in said hot well and at a rate such as to maintain a stable bubble in said liquid with the periphery of such bubble located stably on said annular surface; an off-take duct communicating with said hot well for receiving exhaust effluent from said hot well; a scrubber connected to said off-take duct, such scrubber including a scrubbing duct, a barrier obturating such scrubbing duct, said barrier having apertures therein adapted to produce an effluent flow velocity therethrough in the range 100 to 400 feet per second with a pressure drop not less than 15 inches water gauge across said barrier; liquid spray means adapted to project a coarse spray of hot weak phosphoric acid at the upstream face of said barrier to cause such sprayed acid to break into droplets moving generally parallel with said face of the barrier, thereby to intercept and intimately mix with effluent flowing through said apertures; a gas/liquid separator connected to said scrubbing duct downstream of said barrier for separating said sprayed acid from the effluent; and means for treating the separated effluent with cold water.

As disclosed in our said co-pending application Serial No. 440,239, we have found that for obtaining said bubble with its periphery on said annular surface, the radial extent (L) of the said annular surface at the lower end of the dip tube (as projected on a plane perpendicular to the dip tube axis) should have a value given by the following formula:

$$L = kR(Q^a - 1)$$

wherein:

R is the radius of the said exhaust orifice;
Q is the heat-release rate of the burner arrangement in millions of B.t.u. per hour;
k is not less than 0.6 and preferably not less than 0.9;
a has a value in the range 0.29–0.32 and is preferably 0.3.

The said annular surface may be planar but preferably is frusto-conical or curved, whereby its inner periphery is somewhat below its outer periphery, so that stable flow of combustion products outwardly over such annular surface is promoted.

Desirably the lower end of the dip tube is surrounded by a shroud to promote stable and symmetrical circulation of liquid in the heating zone in the region of the immersed portion of the dip tube, such shroud thereby tending to stabilize the flow of combustion products over the outer periphery of the said annular surface at the lower end of the tube by preventing unstable and asymmetric liquid flows in the region of the lower end of the dip tube from disturbing the desired smooth sheet-like flow of combustion products over said annular surface. Said shroud preferably is of frusto-conical form, coaxial with the orifice of the dip tube, and desirably has its lower end positioned at such distance below the lower end of the dip tube as to capture all combustion products exhausting from the dip tube orifice and the shroud extending upwardly and outwardly to a height such as to extend near to or beyond the acid level in the evaporator.

The circulation of acid promoted by said shroud ensures that the outer aspect of the dip tube is thoroughly and uniformly washed by the acid, conducing to good and uniform transfer of heat from this region of the dip tube to the acid and thereby enhancing thermal efficiency as well as avoiding the development of local hot spots on parts of the dip tube and minimising the building of incrustations of polymeric phosphates.

With such a shroud, combustion products and entrained acid are thoroughly mixed to produce excellent transfer of heat from the combustion products to the acid, the acid separating from the gases above the shroud falling to the outside thereof to return substantially uniformly and symmetrically to the region of dip tube orifice.

Desirably the combustion chamber (in which fuel and oxidant are burnt to the required combustion products) and the dip tube together constitute a passage the cross-section of which diminishes towards the dip tube orifice, whereby the flow of combustion products has a high velocity in the region of the orifice to minimize the risk of acid rising into the dip tube upon any momentary change in combustion conditions.

Moreover, desirably means are provided for injecting a gaseous fluid, such as air, into the bore of the dip tube so as, inter alia, to adjust the average temperature of the gases to a suitable value and to increase gas velocity through the dip tube orifice. In a typical embodiment of the invention, the injected gaseous fluid is adapted to form a shell lining the dip tube orifice and flowing over the inner region of the annular end surface of the tube, thereby restricting heat transfer from the combustion products to the dip tube and, consequently, the development of undesirably high temperatures on those surfaces likely to be intermittently wetted by the acid.

Desirably the evaporator has a hot well of small volume and into which the dip tube depends whereby the volume of acid subjected to heating is restricted and rapid heating thereof achieved, so that the acid is subject to minimum retention at the temperature required to effect evaporation.

Desirably said hot well is shaped and dimensioned to provide a small annular clearance space externally of said shroud, the latter extending to within a small distance from the base of the hot well so as to define, with the hot well wall and base, a passage through which may occur a symmetrical return flow of acid from the upper part of the hot well to the region of the dip tube exhaust orifice, whereby the acid in the hot well uniformly follows a toroidal flow path around the shroud and all portions of the acid are subject to actual retention in the hot well for a period closely approximating to the theoretical mean retention time as computed from hot well volume, feed and withdrawal rate values.

Conveniently, the scrubber and the gas/liquid separator (e.g. a cyclone) may operate in a closed acid circuit, acid solution recovered from the separator being fed to a tank from which it is drawn to be sprayed at the scrubber barrier, the concentration of the acid solution being maintained within appropriate limits by drawing off acid from the tank, e.g. for addition to the evaporator feed, and adding water to the tank to replace the withdrawn acid.

Typical apparatus constructed in accordance with the invention, for carrying out the process thereof to effect concentration of phosphoric acid of $P_2O_5$ content about 54% w./w. to "astrophosphoric" acid of $P_2O_5$ content about 80% w./w. at a throughput of at least 50 tons $P_2O_5$ per day is illustrated by way of non-limitative example in the accompanying drawings, in which.

Figure 1:
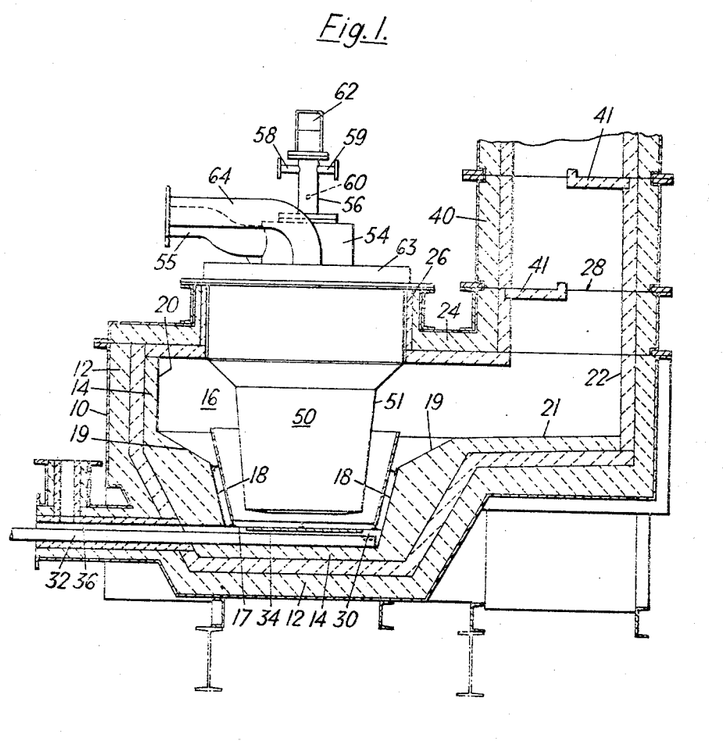
FIGURE 1 is a vertical sectional view of an evaporator forming part of apparatus in accordance with the invention, the section being taken on line 1—1 of FIGURE 2.
Figure 2:
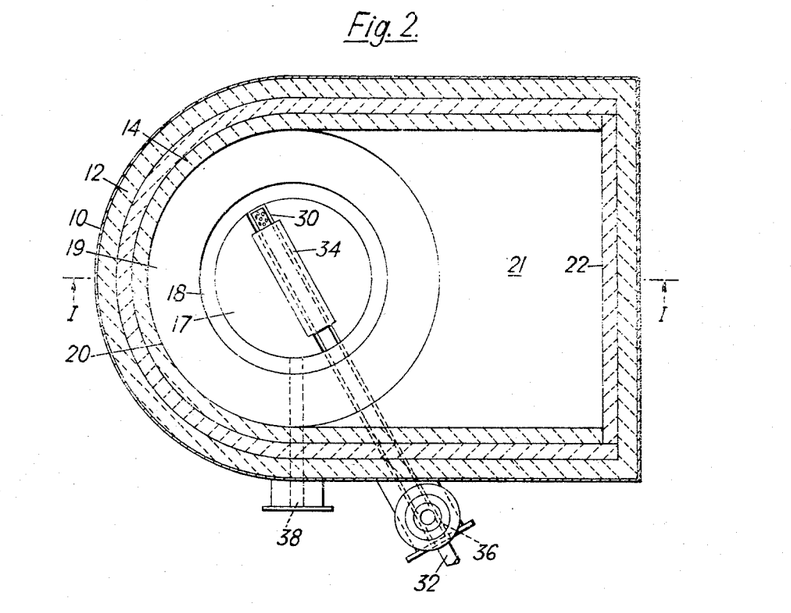
FIGURE 2 is a plan view of the evaporator of FIGURE 1, with the cover and burner arrangement of such evaporator omitted for clarity.

The evaporator illustrated in FIGURES 1 and 2 of the drawings comprises a shell 10, for instance of lead-lined mild steel or of stainless steel so as to resist corrosion by acid contacting same by leakage through the linings described below, such shell 10 being internally lined with an outer lining 12 of acid-resisting masonry and, except for the base of the hot well described below, an inner lining 14 of two courses of carbon bricks. The shell 10 is approximately rectangular in plan (see FIGURE 2) with one semi-circular end, having an overall length of about 10′ 6″, a width of about 8′ and an overall height of about 5′.

The shell 10 and its linings 12, 14 are shaped to provide a hot well 16 of generally truncated conical shape, the axis of which is vertical and coincides with the centre of curvature of the semi-circular end of the shell, the hot well 16 having a base 17 of diameter of about 36″ with a wall 18 that slopes upwardly and outwardly to a diameter of about 44″ at a height of about 12″ above the base 17, the wall 18 then continuing as at 19 with a greater outward slope to a diameter of about 68″ at a height of 22″ above the well base 17. The inner (exposed) course of lining 14 at the base of the hot well 17 is constituted by fused alumina refractory bricks. Above this height, the well 16 is bounded by vertical walls 20 conforming in plan outline with the plan shape of the shell. At the side of the well 16 remote from the semi-circular end of the shell, the wall 20 of the shell has a substantially horizontal step 21 running out to the vertical end surface 22 of the inner lining of the shell, such step 21 rising to a height of about 23″ above the well base 17 at the junction of the step 21 and said vertical end surface 22.

The shell has a top cover 24 with an aperture 26 over the hot well and a rectangular effluent outlet aperture 28, about 68″ x 19″, one longer side of which aligns with the vertical surface 22 of the shell inner lining 14 at the end of said step 21.

The base 17 of the hot well is formed with a diametral channel 30 about 4″ wide and 4″ deep that is aligned with coaxial acid inlet and outlet pipes extending through the wall of the shell 10 and its linings 12, 14, the outlet pipe 32 being of about 3″ diameter and extending within said channel 30 to the far side of the hot well and being covered by a ½″ thick fused alumina plate 34 about 30″ long closing the central portion of the said channel. The inlet pipe 36 is constituted by the annular space between the outlet pipe and a 4″ bore through the shell wall and its linings. The shell and its linings are also fitted with a 3″ bore pipe 38 extending to the hot well 16 just above the base 17 thereof and serving as an alternative acid outlet.

The effluent outlet 28 of the said cover communicates with a rectangular-section vertical off-take duct 40 fitted internally with baffles 41 to deflect the effluent from side to side to cause deposit of entrained liquid in the effluent. Depending upon product requirements, the upper region of the off-take duct may be fitted with means as indicated at 42 (FIGURE 5) for introducing a phosphoric acid solution to flow over the baffles 41 in the duct 40 to condense phosphoric acid vapour in the effluent and return same to the evaporator as a reflux and feed component. Alternatively, the off-take duct 40 may be fitted with at least one contact tray 43 (FIGURE 5) irrigated with a phosphoric acid solution to condense and absorb phosphoric acid vapour and produce a side stream product having a low content of impurities and a $P_2O_5$ content of about 50% w./w. (IFB), constituting a valuable intermediate for the production of, for instance, industrial grade phosphoric acid and phosphates.

The off-take duct 40 leads the effluent to suitable effluent-treatment equipment which is as disclosed in our copending application Serial No. 440,184 and is hereinafter described with reference to FIGURES 5 and 6.

Figure 3:
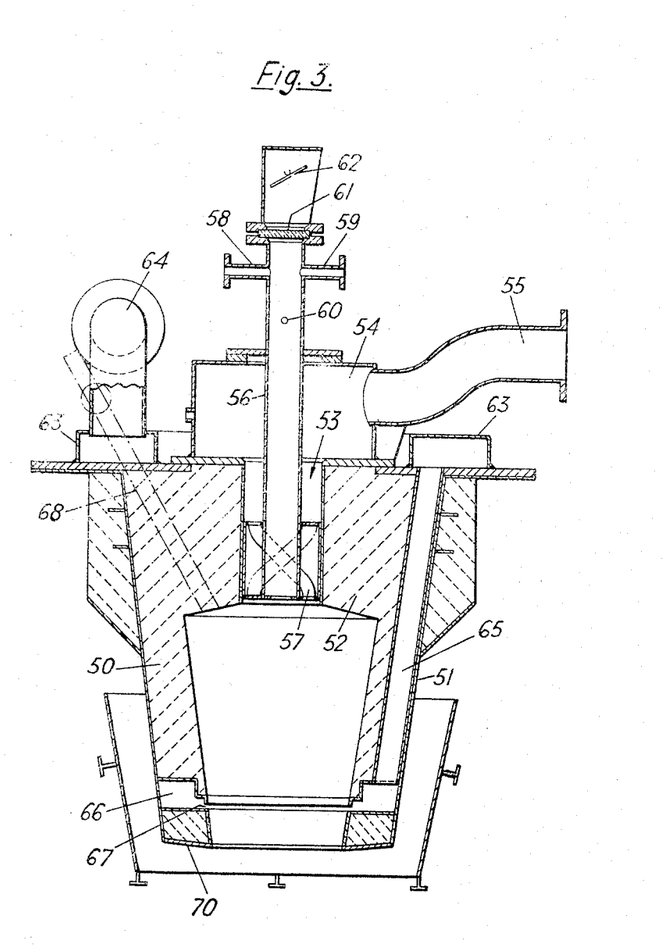
FIGURE 3 is a vertical sectional view of the burner arrangement of the evaporator of FIGURE 1.
Figure 4:
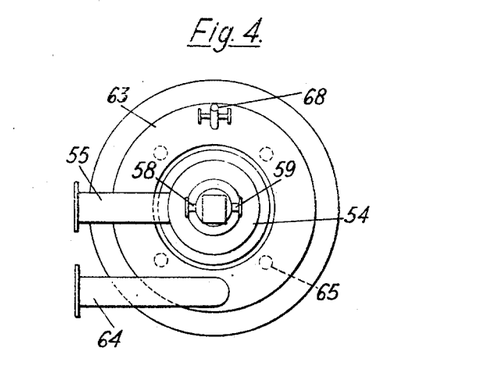
FIGURE 4 is a plan view of the burner arrangement of FIGURE 3.

The cover aperture 26 over the hot well 16 of the evaporator mounts a burner arrangement, shown separately in FIGURES 3 and 4, that in this embodiment of the invention is designed for a heat-release rate (Q) of about 8 million B.t.u. per hour and comprises an inverted frusto-conical dip tube 50 depending accurately vertically into the hot well 16 and having an outer shell 51 of a suitable acid-resistant metal lined with refractory and closed at its upper end by a refractory plug 52 with a central aperture 53. The interior of the dip tube 50 defines a frusto-conical passage tapering from a diameter about 23″ to an exhaust orifice diameter of about 15″ ($R=7.5″$) at its lower end.

Above the refractory plug 52, the burner arrangement includes a fuel mixture chamber 54 adapted to be fed with a mixture of fuel (natural) gas and air through a suitable inlet pipe 55. Such chamber 54 communicates with the interior of the dip tube 50 via the said central aperture 53 in the refractory plug 52, which aperture is coaxially fitted with a pilot tube 56 surrounded by a set of helically-arranged pipes 57 whereby the gas/air mixture passing from the mixture chamber 54 to the dip tube through said pipes 57 is given rotational motion.

The pilot tube 56 is fitted with a tube 58 for feeding gas thereto, a tube 59 for purging the pilot tube 56 and a spark plug 60 for igniting gas fed through tube 58 to produce a pilot flame extending into the head of the dip tube passage. The upper end of the pilot tube 56 is closed by a transparent disc 61 surmounted by a mirror 62 whereby the flame in the dip tube may be observed.

The head of the dip tube further mounts an annular secondary air chamber 63 adapted to be fed with air through a suitable inlet 64. Such chamber 63 connects with the upper ends of a plurality (e.g. four) ducts 65 extending through the refractory plug 52 and within the dip tube wall at intervals therearound, such ducts 65 leading to an annular chamber 66 within the dip tube wall, the ring axis of such chamber 66 being about 6″ above the lower end of the dip tube. Such chamber 66 has an outlet in the form of a slot 67 in the inner wall of the dip tube 50 at a height about 5″ above the lower end of the latter.

A tube 68 extends through the plug 52 and terminates outside the head of the dip tube, in a photocell-type of flame sensor (not shown) forming part of an automatic flame-failure alarm system of conventional type.

The lower end of the dip tube 50 is defined by an annular acid-resisting thermally conductive plate 70 that is dished so that its radii are upwardly and outwardly inclined at an angle of about 5° to the horizontal. Its internal diameter matches that of the dip tube at its lower end, i.e. about 15" and its outer diameter is about 27"; that is, its radial extent (L) is about 6".

The lower end of the dip tube 50 is externally embraced by a frusto-conical shroud 72 of acid-resisting material, this shroud 72 having an axial length of about 19" and upper and lower end diameters of 42" and 33" respectively. Its lower end is positioned about 2" below the plane of the dip tube orifice.

The burner arrangement is supported by the evaporator cover so as to depend accurately vertically into the hot well of the evaporator and coaxially of such hot well, with the dip tube orifice positioned about 3" above the base 17 of the hot well 16. The shroud 72 thus has its lower end about 1" above the base of the hot well.

Figure 5:
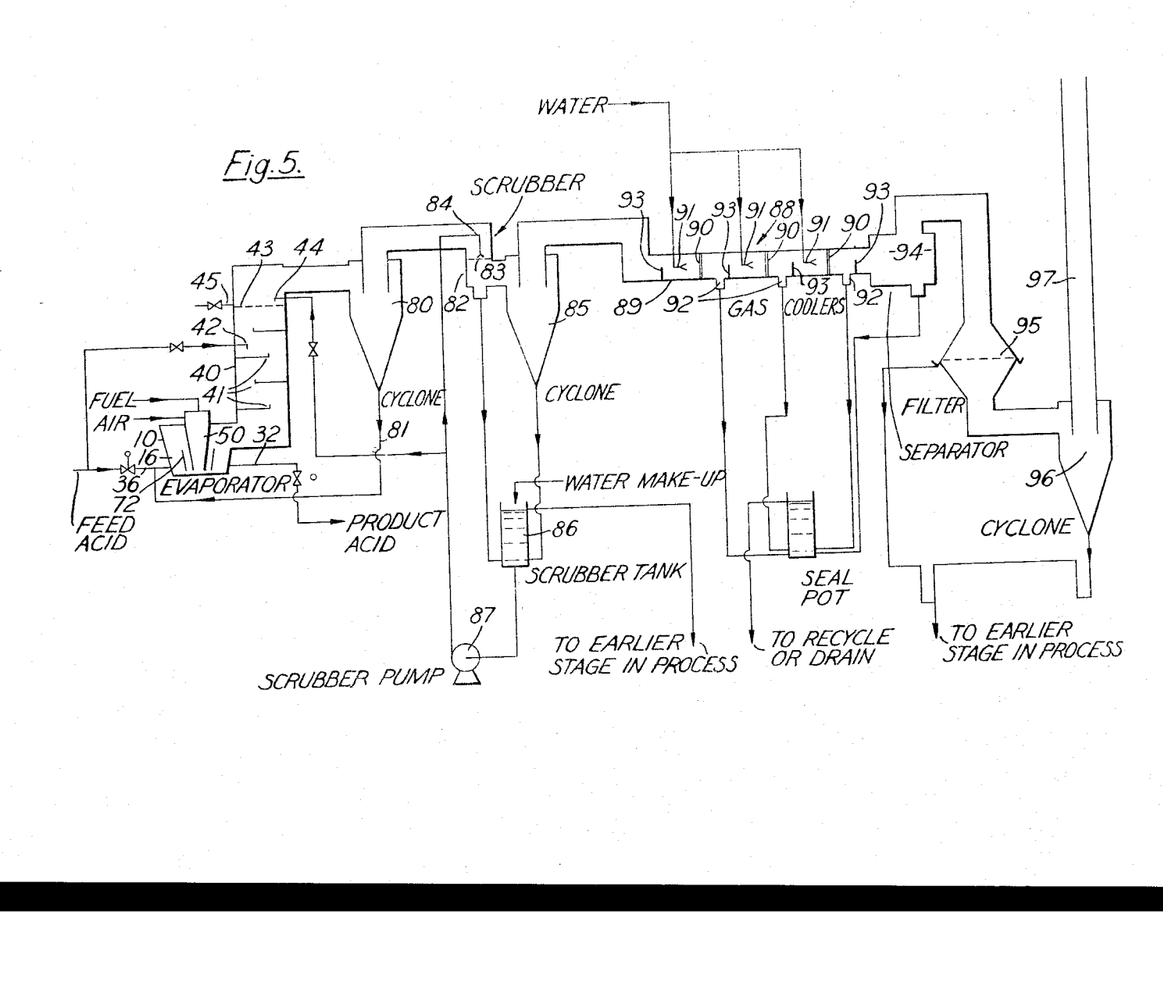
FIGURE 5 is a flow-sheet diagram of the apparatus including and associated with the evaporator of FIGURES 1 and 2 for carrying out the process of the invention.
Figure 6:
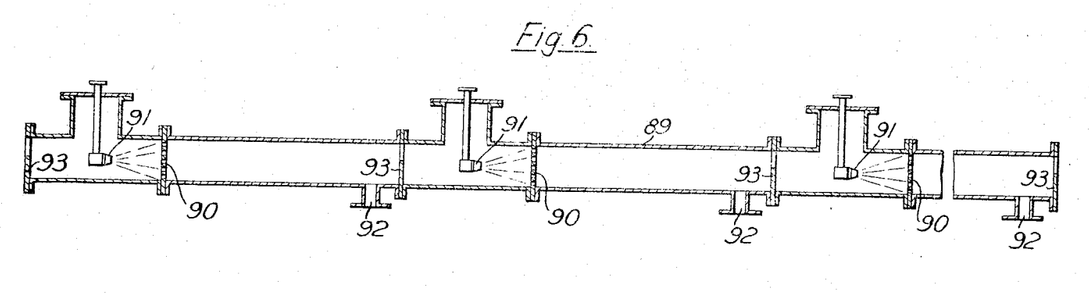
FIGURE 6 is a longitudinal section of a three-stage gas cooler forming part of the apparatus of FIGURE 5.

Referring now to FIGURES 5 and 6, the effluent-treating equipment and other components associated with the evaporator of FIGURES 1 and 2 for carrying out the process of the invention will now be described in detail.

As shown in FIGURE 5 and as previously mentioned, the upper part of the off-take duct 40 of the evaporator is provided with an inlet 42 through which phosphoric acid may be introduced into the duct to cascade over the baffles 41 therein to condense phosphoric acid vapour in the effluent and return same to the evaporator as a feed and reflux component. Also the upper part of the duct 40 is fitted with a contact tray 43, an inlet 44 for phosphoric acid solution for irrigating tray 43 and an outlet 45 for withdrawing a side stream of enriched, relatively pure, phosphoric acid from tray 43, it being understood that phosphoric acid will be fed to inlets 42, 44 selectively in accordance with product requirements.

The off-take duct 40 of the evaporator leads to effluent-treating equipment comprising a cyclone separator 80 for primary removal of gross particulate and droplet contaminants in the effluent, the separated contaminants being returned to the evaporator inlet 36 via a line 81 while the effluent passes on to a scrubber duct 82 through which the effluent flows downwardly, this duct 82 being obturated by a barrier 83 having circular apertures therein, such apertures having diameters in the range ⅛ inch to 1 inch and conveniently about ½ inch, the size and number of the apertures being such that the effluent flows through each aperture at a velocity in the range 300–350 feet per second with a pressure drop across the barrier in the range 35–40 inches W.G. Upstream of the barrier 83, a spray nozzle 84 is arranged to project a solid cone coarse spray of phosphoric acid solution at the barrier to cause droplets of such solution to move generally parallel with the barrier so as to intercept and intimately mix with the effluent flowing through the barrier apertures. This solution has a $P_2O_5$ content and temperature such as to achieve maximum absorption of phosphorus compounds in the effluent. If phosphoric acid is being introduced through neither of inlets 42, 44 in the off-take duct 40 of the evaporator to condense phosphoric acid vapour in the effluent, the solution sprayed from nozzle 84 at the barrier 83 conveniently has a $P_2O_5$ content in the range 30–50% w./w. and a temperature in the range 70–120° C. (160–250° F.). If, however, the phosphoric acid vapour content of the effluent is reduced by introduction of phosphoric acid through either of inlets 42, 44, solution sprayed from nozzle 84 may be cooler and of lower $P_2O_5$ content.

Downstream of the barrier 83, the scrubber duct 82 leads to a separator such as a cyclone 85; in this the phosphoric acid solution is separated from the effluent and is returned to a tank 86 for recirculation by a pump 87 to the spray nozzle 84. To maintain the required $P_2O_5$ content in the solution, acid is continuously drawn from the tank and replaced by water, the withdrawn acid conveniently being added to the evaporator feed.

The effluent leaving the separator 85 passes to a three-stage gas cooler 88 shown in detail in FIGURE 6 and constituted by a horizontal duct 89 having three barriers 90 therein, each with apertures which are substantially circular with a diameter in the range ⅛ inch to 1 inch and conveniently about ½ inch, the number and size of the apertures in each barrier 90 being such that the effluent flows through the apertures therein at a velocity in the range 80–100 feet per second (preferably about 85 feet per second) with a pressure drop across the barrier 90 not exceeding about 4 inches W.G. (preferably about 3 inches W.G.).

Upstream of each barrier 90 a spray nozzle 91 is arranged to project a solid cone spray of cold water at the barrier to impinge thereon and produce droplets that move generally parallel with the barrier to intercept and mix intimately with the effluent, flowing through the barrier apertures, to cool same and extract the bulk of the residual phosphorus, sulphur and fluorine compounds therefrom. The duct 89 is provided with appropriate drains 92, for removal of the sprayed water, and plates 93 obturating the lower part of the cross-section of the duct to prevent backflow of water to the cyclone 85.

Downstream of duct 89, the effluent is passed through a separator 94 and thereafter through a fibre filter 95 to effect agglomeration of fine mist-like particles in the effluent and thereafter the effluent passes to a cyclone 96 or like separator to remove the droplets formed by such agglomeration, the effluent then passing to a stack 97 for discharge to atmosphere.

In operation, and when steady state conditions have been achieved, wet-process phosphoric acid at a $P_2O_5$ content of about 54% w./w. is continuously fed into the hot well of the evaporator via the acid inlet pipe 36 and concentrated acid at a $P_2O_5$ content of about 80% w./w. is withdrawn continuously via one or other of the acid outlet pipes 32, 38, the rates of feed and withdrawal being respectively controlled by temperature and level sensing devices (not shown), the former in the hot well. A gas/air mixture and secondary air are respectively supplied to the appropriate head chambers 54, 63 of the burner arrangement, the mixture passing into the upper, combustion chamber-constituting, part of the dip tube passage to burn therein and produce hot products of combustion that flow towards the dip tube orifice, being maintained at high velocity by the convergence of the passage and by the entry of secondary air from said slot 67 in the dip tube wall just above the orifice thereof. Such secondary air cools the gas stream and some flows over the inner region of the end plate 70 to minimise the development of hot spots on areas subject to intermittent wetting by the acid.

The flow rates of gas/air mixture and secondary air are adjusted to give rise to a stable flow of combustion products and air from the orifice of the dip tube at such a rate as to maintain a flat bubble of gases over the lower end of the dip tube with its boundary at all times located on the said end plate 70 of the dip tube.

Referring to the formula given hereinabove it will be observed that the radial extent (L) of the plate 70 is just in excess of the preferred minimum value ($L=5.85"$) obtained by substituting $R=7.5$, $k=0.9$ and $a=0.3$ in the formula when $Q=8$; assuming complete stability of combustion, liquid level (nominal) and pressure within the evaporator, mainly stable operation at $Q=8$ could be expected with a radial extent (L) of 3.75" obtained by substitution of the minima ($k=0.6$, $a=0.29$) for the constants in the formula, values that imply location of the bubble periphery on the peripheral margin of the plate 70. Selection of the preferred value (0.3) for the exponent $a$ implies an adequate tolerance for combustion irregularities (variations in fuel calorific value and the transient fluctuations that may be expected with a suitable sensitive and stable combustion control system) whilst higher values of $a$ up to 0.32 provide yet greater tolerance to combustion irregularities and, particularly, to liquid flow irregularities in the vicinity of the dip tube lower end, for instance in the absence of the circulation-promoting shroud 72. The coefficient $k$ is significant of the location of the bubble periphery on the plate 70; the value 0.9 for this coefficient implies location of the bubble periphery at the mean radius of the plate 70.

Thus whilst the burner assembly as described has the optimum design for $Q=8$, satisfactory operation with careful control should be possible at higher values of Q, the highest value derivable from the formula being $Q=18.6$ that is, a heat-release rate in excess of 18 million B.t.u./hour. As hereinafter described, the illustrated evaporator has demonstrated completely stable operation in concentrating wet-process phosphoric acid to $P_2O_5$ contents of up to 79% w./w. with burner heat-release rates up to 13 million B.t.u./hour.

The following tabulation illustrates the performance of the process of the invention and the apparatus thereof. In this tabulation, runs 1–5 were performed with the apparatus as described with reference to the drawings and with the evaporator dimensioned as described; in runs 6 and 7 a generally similar but smaller scale apparatus was used whilst run 8 was performed with a general purpose pilot plant having an evaporator of conventional design and an effluent-treating system that did not include the first cyclone separator, upstream of the scrubber, of the apparatus of FIGURE 5. In none of the tabulated runs was phosphoric acid fed to the inlets 42, 44 of the evaporator off-take duct.

| Run | 1 | 2 | 3 | 4 | 5 | 6 | 7 | 8 |
|---|---|---|---|---|---|---|---|---|
| Feed Acid: | | | | | | | | |
| $P_2O_5$ percent w/w | 57.4 | 56.4 | 57.7 | 57.8 | 58.8 | 50.1 | 72.8 | 51 |
| $SO_3$ percent w/w | 5.8 | 5.8 | 5.6 | 6.2 | 6.1 | 5.7 | | |
| Fluorine percent w/w | 0.8 | 0.8 | 0.78 | 0.78 | 0.8 | 0.35 | | 0.9 |
| $Fe_2O_3 + Al_2O_3$ percent w/w | 1.8 | 1.9 | 1.8 | 1.6 | | | | 0.81 |
| Water-insol. Solids | 0.3 | 0.67 | 0.28 | 0.29 | 0.39 | | | |
| Throughput, $P_2O_5$ tons/day | 88 | 86 | 113 | 106 | 88 | 6.4 | 16.7 | 5.5 |
| Burner Heat-Release, B.t.u./hour × 10⁶ | 9.35 | 9.35 | 11 | 13 | 11 | 1.09 | 1.18 | 0.53 |
| Evaporation Temp. °F | 640 | 645 | 680 | 700 | 750 | 700 | 780 | 540 |
| Acid Product: | | | | | | | | |
| $P_2O_5$ percent w/w | 74.5 | 75.4 | 76.2 | 79.0 | 79.6 | 76.6 | 79.7 | 71.4 |
| Water-insol. solid percent w/w | 0.75 | 1.1 | 1.6 | 3.6 | 5.2 | 2.2 | 2.0 | |
| Citrate-insol. $P_2O_5$ percent w/w | 0.26 | 0.37 | 0.56 | 1.25 | 1.8 | 0.8 | 0.7 | |
| Percent $P_2O_5$ converted to poly-acids | 73 | 79 | 80 | 86 | 86 | | | c. 30 |
| Exit Temps. °F.: | | | | | | | | |
| 1st Cyclone | 590 | 620 | 650 | 675 | | 550 | 660 | |
| Scrubber Cyclone | 180 | 180 | 180 | 180 | 182 | 190 | 198 | |
| Cooler 1 | 110 | 110 | 115 | 120 | 120 | 161 | | 140 |
| Cooler 2 | 90 | 93 | 98 | 100 | 95 | 133 | 140 | 93 |
| Cooler 3 | 85 | 90 | 85 | 90 | 90 | 104 | 108 | 75 |
| Stack gas | 85 | 87 | 85 | 88 | 89 | 103 | 106 | |
| Water inlet | 75 | 77 | 68 | 73 | 78 | 60 | 60 | |
| Water outlet | 95 | 95 | 93 | 100 | 100 | 110 | 99 | |
| Tank 86 | 170 | 170 | 180 | 175 | 174 | 192 | 208 | |
| ΔP, in W.G.: | | | | | | | | |
| Scrubber and Cyclone(2) | 22 | 50 | 54 | 51 | 58 | 40 | 40 | 26 |
| Cooler 1 | 6 | 5 | 6 | 5 | 7 | 2 | 2 | 3 |
| Cooler 2 | 5 | 3 | 3 | 5 | 7 | 2 | 2 | 3 |
| Cooler 3 | 4 | 4 | 5 | 2 | 5 | 3 | 3 | 3 |
| Filter | 29 | 13 | 12 | 25 | 23 | 26 | 24 | 15 |
| Water gals/hour | 19,200 | 19,200 | 15,800 | 17,300 | 19,200 | | | 1,135 |
| $P_2O_5$ entering effluent treatment system—percent throughput | 4.4 | 5.0 | 3.2 | 5.4 | 9.3 | 8.2 | 13.2 | 0.9 |
| lbs/hr | 323 | 362 | 306 | 475 | 682 | 44 | 183 | 4 |
| Loss $P_2O_5$ in water—lbs/hr | 2.2 | 3.6 | 3.6 | 4.6 | 1.5 | 1.1 | 0.5 | 1.1 |
| Loss $P_2O_5$ in stack gas | 0 | Trace | 0 | Trace | Trace | 0.4 lbs/hr. | 0.4 lbs/hr. | |
| Scrubber and filter $P_2O_5$ recovery—percent | 99.3 | 99 | 98.8 | 99 | 99.8 | 96.5 | 99.5 | 73 |
| Scrubber liquor $P_2O_5$ percent w/w | 4.2 | 6.1 | 3.6 | 7.7 | 2.9 | 29 | 34 | 4 |
| Fluorine, into effluent treatment system—lbs/hr | 59 | 57 | 74 | 69 | 58 | 3.7 | | 7.4 |
| Loss to atmos | 0.09 | 0.06 | 0.1 | 0.09 | 0.07 | 0.02 | | 0.04 |

It will be observed that the successive runs 1 to 5 were made with progressively higher evaporation temperatures (boiling point of product acid within the evaporator) to achieve progressively greater $P_2O_5$ contents in the product.

It is significant that although all the runs 1 to 5 were made with burner heat release rates significantly higher than the design value (but less than the 18.6 million B.t.u./hour maximum computed from the formula), the trend of insoluble content (citrate insoluble $P_2O_5$) of the product acid is closely related to the evaporation temperature, showing that stable burner operation occurred in all runs since bubble instability at the dip tube orifice would have been marked by an anomalously high insoluble content of the product. At the 13 million B.t.u./hour release rate of run 4 the bubble periphery was clearly still located on the plate 70.

It should be pointed out that the tabulated values for $P_2O_5$ carried into the effluent-treatment system during runs of 1 to 5 are remarkably low for a submerged combustion evaporator concentrating phosphoric acid at the throughputs of these runs, a further indication of the stability and completeness of the gas/liquid contact process in the evaporator. The efficiency of the effluent system in recovering such $P_2O_5$ should be noted.

We claim:
1. A process for the obtaining of phosphoric acids of high $P_2O_5$ content, comprising continuously feeding a wet-process phosphoric acid solution to a heating zone and continuously withdrawing a more concentrated product containing at least 68% $P_2O_5$ w./w. (IFB) from such zone while maintaining such product at its boiling point in said zone by releasing hot combustion products into the body of the product in said zone; passing the gaseous effluent from such zone to a scrubbing zone to flow therein at a velocity in the range 15 to 100 feet per second; causing said effluent to flow with a velocity in the range 100 to 400 feet per second while passing through apertures in a barrier obturating said scrubbing zone, thereby to effect a pressure drop not less than 15 inches water gauge across said barrier; projecting a coarse spray of hot weak phosphoric acid at the upstream face of said barrier to cause large droplets of such acid to break, on said face of the barrier, into smaller droplets that move generally parallel with said barrier face and intercept the effluent flowing through said apertures; separating said sprayed phosphoric acid from the effluent downstream of said barrier; and thereafter treating the separated gaseous effluent with cold water.

2. The process of claim 1, wherein the phosphoric acid sprayed at said barrier in said scrubbing zone has a $P_2O_5$ content in the range 30–50% w./w.

3. The process of claim 2, wherein said phosphoric acid has a temperature in the range 70–120° C. (160–250° F.).

4. The process of claim 1, wherein said effluent is caused to flow through said barrier apertures at a velocity in the range 300–350 feet per second with a pressure drop in the range 35–40 inches water gauge.

5. The process of claim 1, wherein said treatment of the separated gaseous effluent with cold water is effected by passing said effluent through a cooling zone to flow therein at a velocity in the range 15 to 100 feet per second; causing said effluent to flow with a velocity in the range 50 to 100 feet per second while passing through apertures in at least one barrier obturating said cooling zone while effecting a low pressure drop in the effluent stream across such barrier; projecting a coarse spray of water at the upstream face of said barrier to cause water droplets to move generally parallel with such face of said barrier to intercept and mix intimately with the effluent stream passing through said apertures; and thereafter separating the effluent from such water downstream of said barrier.

6. The process of claim 5, including filtering said effluent to agglomerate residual water droplets entrained therein and thereafter separating the agglomerated droplets from the gaseous effluent.

7. A process for obtaining phosphoric acid of high $P_2O_5$ content and low content of insoluble polyphosphate and metaphosphate compounds, comprising: continuously feeding a wet-process phosphoric acid solution to a heating zone and continuously withdrawing a more concentrated product containing at least 68% $P_2O_5$ w./w. (IFB) from said zone; passing hot combustion products into a dip tube depending vertically into the liquid in said heating zone to be released from an exhaust orifice at the lower end of said dip tube into the body of liquid in such zone while forming a stable bubble at said lower end of said dip tube with the periphery of the bubble stably located on an annular surface surrounding said exhaust orifice, thereby to maintain liquid in said heating zone at the boiling point of said product; passing the gaseous effluent from such zone to a scrubbing zone to flow therein at a velocity in the range 15 to 100 feet per second; causing said effluent to flow with a velocity in the range 100 to 400 feet per second while passing through apertures in a barrier obturating said scrubbing zone, thereby to effect a pressure drop not less than 15 inches water gauge across said barrier; projecting a coarse spray of hot weak phosphoric acid at the upstream face of said barrier to cause large droplets of such acid to break, on said face of the barrier, into smaller droplets that move generally parallel with said barrier face and intercept the effluent flowing through said apertures; separating said sprayed phosphoric acid from the effluent downstream of said barrier; and thereafter treating the separated gaseous effluent with cold water.

8. The process of claim 7, wherein the phosphoric acid sprayed at said barrier in said scrubbing zone has a $P_2O_5$ content in the range 30–50% w./w.

9. The process of claim 8, wherein said phosphoric acid has a temperature in the range 70–120° C. (160–250° F.).

10. The process of claim 7, wherein said effluent is caused to flow through said barrier apertures at a velocity in the range 300–350 feet per second with a pressure drop in the range 35–40 inches water gauge.

11. The process of claim 7, wherein said treatment of the separated gaseous effluent with cold water is effected by passing said effluent through a cooling zone to flow therein at a velocity in the range 15 to 100 feet per second; causing said effluent to flow with a velocity in the range 50 to 100 feet per second while passing through apertures in at least one barrier obturating said cooling zone while effecting a low pressure drop in the effluent stream across such barrier; projecting a coarse spray of water at the upstream face of said barrier to cause water droplets to move generally parallel with such face of said barrier to intercept and mix intimately with the effluent stream passing through said apertures; and thereafter separating the effluent from such water downstream of said barrier.

12. The process of claim 11, including filtering said effluent to agglomerate residual water droplets entrained therein and thereafter separating the agglomerated droplets from the gaseous effluent.

13. The process of claim 7, including causing hot weak phosphoric acid solution to flow in countercurrent over baffles in an upwardly flowing stream of effluent between said heating zone and said scrubbing zone.

14. The process of claim 7, wherein said product is held at heating zone temperature for a short period.

15. Apparatus for concentrating wet-process phosphoric acid to $P_2O_5$ contents greater than 68% w./w. (IFB), such apparatus comprising an evaporator including a hot well; means for feeding a wet-process phosphoric acid solution to such hot well; means for withdrawing a more concentrated product from such hot well; a dip tube depending vertically into said hot well, said dip tube having its lower end positioned to be below the level of liquid in said hot well and terminating in an exhaust orifice; an annular surface surrounding said exhaust orifice; means for feeding hot combustion products to said dip tube to be released from said exhaust orifice into the body of liquid in said hot well and at a rate such as to maintain a stable bubble in said liquid with the periphery of such bubble located stably on said annular surface; an off-take duct communicating with said hot well for receiving exhaust effluent from said hot well; a scrubber connected to said off-take duct, such scrubber including a scrubbing duct, a barrier obturating such scrubbing duct, said barrier having apertures therein adapted to produce an effluent flow velocity therethrough in the range 100 to 400 feet per second with a pressure drop not less than 15 inches water gauge across said barrier; liquid spray means adapted to project a coarse spray of hot weak phosphoric acid at the upstream face of said barrier to cause such sprayed acid to break into droplets moving generally parallel with said face of the barrier, thereby to intercept and intimately mix with effluent flowing through said apertures; a gas/liquid separator connected to said scrubbing duct downstream of said barrier for separating said sprayed acid from the effluent; and means for treating the separated effluent with cold water.

16. The apparatus of claim 15, wherein said annular surface surrounding the exhaust orifice of said dip tube has a radial extent (L) as computed from the formula:

$$L = kR(Q^a - 1)$$

wherein

R is the radius of the said exhaust orifice
Q is the heat release rate of the burner arrangement in millions of B.t.u. per hour
$k$ is not less than 0.6
$a$ has a value in the range 0.29–0.32.

17. The apparatus of claim 16, in which $k$ is not less than 0.9 and $a$ has the value 0.30.

18. The apparatus of claim 17, including a shroud surrounding the lower end of said dip tube.

19. The apparatus of claim 18, wherein said shroud is frusto-conical, coaxial with said exhaust orifice and has its lower end positioned below the level of said exhaust orifice to capture combustion products exhausting from such orifice.

20. The apparatus of claim 19, in which said hot well and said shroud define an annular passage for return flow of liquid from the upper part of the hot well to the vicinity of the dip tube exhaust orifice.

21. The apparatus of claim 15, wherein said off-take duct is vertically disposed; baffles in such off-take duct for diverting the effluent stream from side to side in such duct; and means for introducing hot weak phosphoric acid into such duct to cascade over the baffles therein in countercurrent to said effluent stream.

22. The appaartus of claim 21, including a gas/liquid separator interposed between said off-take duct and said scrubber.

References Cited by the Examiner
UNITED STATES PATENTS

| | | | |
|---|---|---|---|
| 1,429,140 | 9/1922 | Hechenbleikner et al. | 23—307 X |
| 2,146,792 | 2/1939 | Brueckmann et al. | 23—306 X |
| 2,611,881 | 9/1952 | Bellinger | 23—165 |
| 2,764,234 | 9/1956 | Rauh | 159—16 |
| 2,905,535 | 9/1959 | Atkin et al. | 23—165 |
| 3,104,947 | 9/1963 | Switver et al. | 159—16 X |

NORMAN YUDKOFF, *Primary Examiner.*

J. SOFER, *Assistant Examiner.*